Figure 1:
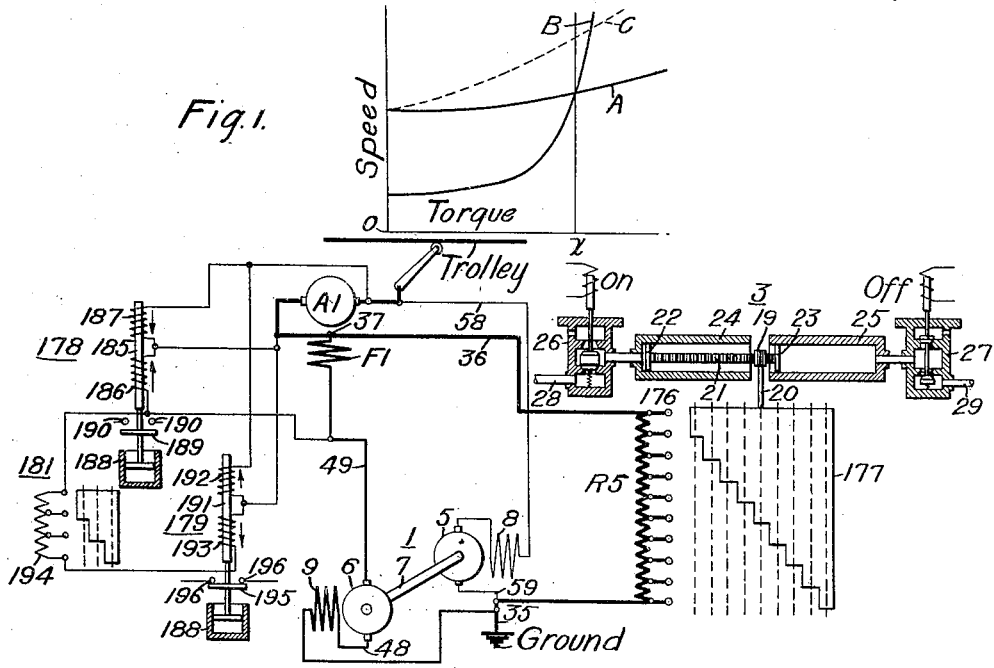

R. E. HELLMUND.
SYSTEM OF CONTROL.
APPLICATION FILED JUNE 25, 1919.

1,339,929.

Patented May 11, 1920.

WITNESSES:
J. A. Helsel
W. R. Coley

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,339,929.      Specification of Letters Patent.      Patented May 11, 1920.

Original application filed April 18, 1917, Serial No. 162,968. Divided and this application filed June 25, 1919. Serial No. 306,704.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification, this application being a division of my copending application, Serial No. 162,968, filed April 18, 1917, and patented July 1, 1919, No. 1,308,070.

My invention relates to systems of control and especially to the braking or retarding of a momentum-driven vehicle by the use of both electrical and mechanical braking systems.

In many cases, it is desirable to impart a relatively "flat" speed-torque operating characteristic to a momentum-driven dynamo-electric machine during regenerative operation, or the equivalent, such characteristic being obtained with induction motors having short-circuited secondary windings or with direct-current motors having circuit connections that inherently, or by suitable control, produce a shunt or a slight compounding characteristic. When a dynamo-electric machine is running in accordance with a relatively "flat" speed-torque curve, a slight change in speed will, of course, effect a material variation of torque and armature current, and such variation may be objectionable. Consequently, if for any reason, the air-brake or other mechanical braking system is required to supplement the electric braking action, an application of mechanical brakes under the above-noted conditions would tend to produce such an objectionable variation of regenerative torque. The variation in question is particularly undesirable in case the mechanical braking system is applied upon a locomotive, as well as upon the trailing or hauled vehicles, since such locomotive application will tend to cause "slipping" of the wheels, in accordance with familiar principles.

One object of my invention is to provide relatively simple and effective means, operative upon the application of a mechanical braking system during the regenerative period, for automatically "steepening" the above-mentioned speed-torque characteristic, that is to say, to cause the momentum-driven machine to operate in accordance with a characteristic curve whereby a change of vehicle speed will not produce an undesirable variation of regenerative torque and current.

More specifically stated, it is the object of my invention to apply the above-mentioned principles particularly to regenerative systems of the direct-current motor type by suitably manipulating certain circuit resistors, or by other equivalent manipulation, upon the application of the air-brakes or other mechanical braking systems, as hereinafter set forth in detail.

Other systems embodying the speed-torque characteristics in question are broadly set forth, for example, in my copending application, Serial No. 157,918, filed March 28, 1917, to which reference may be had for further exposition.

Figure 2:
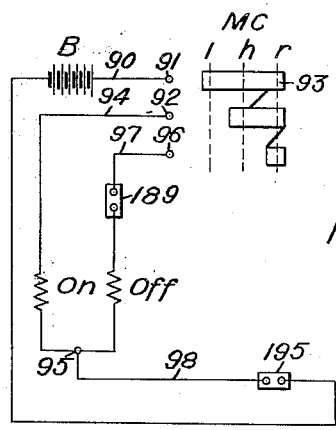
Figure 3:
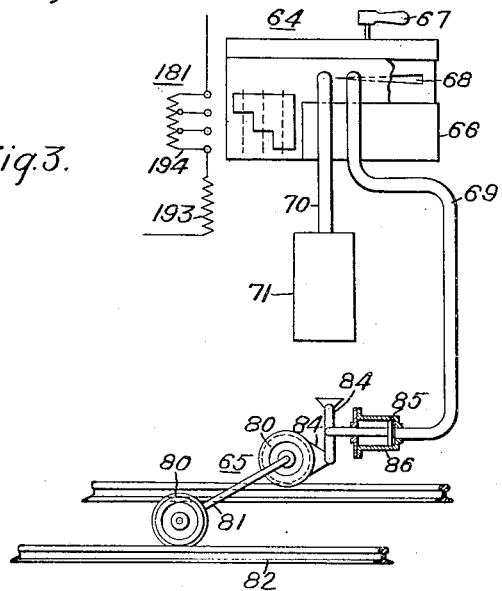

My invention may best be understood by reference to the accompanying drawings, wherein Figure 1 is a curve chart illustrating the operating characteristics, with respect to speed and torque, of a momentum-driven machine governed in accordance with my present invention; Fig. 2 is a diagrammatic view of the essential main and subsidiary circuits of a direct-current system of regenerative control embodying my invention; and Fig. 3 is a diagrammatic view of an auxiliary governing system for the main circuits shown in Fig. 2.

Referring to Fig. 1 of the drawings, two speed-torque curves A and B, corresponding to different final speeds or other different electrical constants of a machine circuit, represent the operation of a direct-current series motor when employed for regenerative purposes, in accordance with my present invention.

Normally the operating characteristic imparted to the momentum-driven machines is represented by the relatively "flat" portion of the curve A, included, for example, between the ordinates *o* and *x*. Under such conditions, a relatively slight change of vehicle speed caused, for example, by the application of air-brakes, when descending a steep grade, will produce a relatively great and undesirable variation of regenerative torque. To obviate this objection, the machines should be provided at the proper time with a relatively "steep" operating characteristic corresponding to the portion of the curve B lying above the curve A, whereupon the change of speed, caused by the air-brake application, effects a relatively slight variation of regenerative torque and current.

Referring to Fig. 2, the direct-current regenerative system shown comprises suitable supply-circuit conductors "Trolley" and "Ground"; a main dynamo-electric machine having an armature A1 and a field winding F1 of the series type; a motor-generator set 1, or the like, for exciting the main field winding F1; an adjustable main-circuit resistor R5, various points of which are connected to a series of stationary control fingers 176 for successively engaging a movable contact member 177 of a control drum 175 that is actuated by an operating mechanism 3; a plurality of relay devices 178 and 179 for maintaining the regenerating speed between predetermined limiting values; and auxiliary contact members 181 that are adapted to govern the operation of the low-speed relay device 179 in a manner to be set forth.

The motor-generator set 1 is shown as comprising a driving or motor armature 5 that may be mechanically connected with a generating or exciting armature 6 by means of a shaft 7, or otherwise; a series-related field winding 8 for the driving armature 5 and a series-related field winding 9 for the exciting armature 6.

The operating mechanism 3 is of a familiar electrically-controlled, pneumatically-actuated type and comprises a pinion 19, which is rigidly secured to the operating shaft 20 of the controller 2 and is adapted to mesh with a horizontally-movable rack member 21, the opposite ends of which constitute pistons 22 and 23 that travel within appropriate operating cylinders 24 and 25, respectively. A normally closed valve 26 is associated with the outer end of the cylinder 24, while a normally open valve 27 communicates with the outer end of the other cylinder 25. Fluid pressure from any suitable source (not shown) is supplied to the respective valve members through pipes or passages 28 and 29. The valve members 26 and 27 are provided with actuating coils marked "On" and "Off," respectively, for reversing the position of the valves.

The mechanical operation of the actuating device just described, without regard to the electrical connections effected thereby, may be set forth as follows: since the valve 27 is normally open, the pistons 22 and 23 and, consequently, the controller 2, are biased to the illustrated positions. Upon the concurrent energization of the actuating coils On and Off, such normally unbalanced fluid-pressure conditions are reversed, that is, fluid pressure is admitted to the cylinder 24 through the valve 26 and is exhausted from the cylinder 25 through the valve 27 to effect a movement of the controller 2 toward the left, in the present instance. To arrest such movement at any time, it is merely necessary to deënergize the off coil, whereby balanced fluid-pressure conditions obtain in the two operating cylinders and a positive and reliable stoppage of the mechanism is produced.

To return the apparatus to the illustrated position, both actuating coils are concurrently deënergized, whereupon fluid-pressure conditions revert to the original unbalanced state, and the desired backward movement is effected.

The high-speed relay device 178 comprises a core or plunger 185 having an actuating coil 186 that is connected across the main field winding F1 and a second coil 187 that is opposingly energized from the main armature A1, as indicated by the arrows. The combined excitation of the relay device 178 is thus dependent upon the relative values of the main-armature voltage and the main-field-winding voltage, or, in other words, the relay is actuated in accordance with the variations of main-machine speed, since the main-field-winding strength is an index of the speed. A suitable dashpot 188 is preferably provided for the usual steadying purpose. The preferred type of differential relay is set forth and claimed in a copending application of C. C. Whittaker, Serial No. 175,595, filed June 19, 1917, and assigned to the Westinghouse Electric and Manufacturing Company.

The relay 178 is provided with a movable contact member or disk 189 which is out of contact with a pair of stationary contact members 190 in the normal or lower position of the relay, and which, in its upper position, completes certain auxiliary circuits to be described in connection with Fig. 3.

The low-speed relay device 179 is similar to that just described, having a core 191, opposing actuating coils 192 and 193 that are respectively energized directly from the main armature A1 and from the field winding F1 through an auxiliary resistor 194, which is controlled by the coöperating contact members 181; a movable contact disk 195 that bridges a pair of stationary contact members 196 in the upper or normal position of the relay to control certain auxiliary circuits, as subsequently set forth.

The arrangement of parts of the high-speed relay 178 during operation is such that the illustrated lower position is maintained until a predetermined higher machine-speed value, as indicated by a decreased voltage across the field winding F1, is reached, whereupon the core 185 is lifted through the agency of the coil 187 to close the circuit that includes coöperating contact members 189 and 190. On the other hand, the core 191 of the low-speed relay device 179 is held in its illustrated upper position until a certain lower machine speed value, as evidenced by an increased main field-winding strength, obtains, whereupon the relay is actuated to its open lower position to interrupt the corresponding auxiliary circuit. Consequently the joint action of the two relay devices 178 and 179 serves to maintain the machine speed within predetermined limiting values.

In this way, although the circuit connections may not inherently impart a relatively "flat" speed-torque characteristic to the momentum-driven machines, the above-described use of the relay devices 178 and 179 will accomplish this result, the "flatness" of the curve being dependent upon the range between the limiting values corresponding to the respective relay devices.

Assuming that regenerative operation has been begun in any suitable and well-known manner, which need not be described here, the main or regenerative circuit is established from the ground conductor, which is of higher potential than the trolley during regenerative operation, through conductor 35, stabilizing resistor R5 and conductor 36, to junction-point 37, whence circuit is continued through main armature A1 to the trolley.

The main-field-winding circuit is completed from the positive terminal of the exciting armature 6 through conductor 48, the auxiliary field winding 9, the stabilizing resistor R5, and conductor 36 to the junction-point 37, whence circuit is completed through main field winding F1 and conductor 49 to the negative terminal of the exciting armature 6.

A further auxiliary circuit is completed from the trolley through conductor 58, field winding 8 and armature 5 of the auxiliary driving motor and conductor 59 to the ground conductor 35.

Reference may now be had to Fig. 3, which illustrates an auxiliary system for automatically governing the action of the controller 177 to produce the desired modification of machine operating characteristics under conditions of an application of a mechanical braking system during the regenerative period.

The auxiliary system illustrated comprises the actuating coils On and Off for the operating mechanism 3, a master controller MC that is adapted to occupy positions $l$, $h$ and $r$ for primarily controlling the operation of the mechanism 3; a battery B or other suitable source of energy; and a mechanical braking system here shown as comprising a manually-operated engineer's valve 64 and a wheel-braking apparatus 65 of the well-known air-operated type.

The system further comprises the insertion of the movable members 189 and 195 of the high-speed and the low-speed relay devices, respectively, in the conductors 97 and 98, and the placing of the coöperating contact members 181 upon the engineer's valve 64 for governing the circuit of the actuating coil 193 for the low-speed relay device 179.

The engineer's valve 64 may be of any suitable construction and is shown as embodying a member 66 that is rotatable in accordance with the manipulations of an operating handle 67 and is provided with a tapered outlet slot 68 that communicates with a brake-pipe 69 for conveying a variable fluid pressure to the wheel-braking apparatus 65. Fluid pressure is conveyed to the engineer's valve 64 through a pipe or passage 70 that communicates with a suitable tank or reservoir 71, the arrangement of parts being such that in the illustrated off or inactive position of the engineer's valve 64, no fluid pressure is admitted to the brake pipe 69.

The braking apparatus 65 may also be of any well-known type and is shown as including a plurality of vehicle wheels 80 that are mounted in the usual manner upon an axle 81 for running on rails 82, and a brake-shoe 83 for gripping the wheels 80 whenever the brake-rigging 84 is actuated through the agency of a piston 85 that travels within a brake cylinder 86, with which the brake-pipe 69 communicates.

Assuming that the master controller is actuated to its final operative position $r$, an auxiliary circuit is established from the positive terminal of the battery B through conductor 90, control fingers 91 and 92 which are bridged by contact segment 93 of the master controller, conductor 94, and the actuating coil On to junction-point 95. A second circuit is completed from contact segment 93 through control finger 96, conductor 97, contact member 189 of the high-speed relay device 178, and the actuating coil Off to the junction-point 95, whence a common circuit is continued through conductor 98, contact member 195 of the low-speed relay device 179 and conductor 99 to the negative battery terminal.

Upon the concurrent energization of the on and the off actuating coils for the operating mechanism 3, a forward movement thereof is effected, in accordance with previously described principles. To manually arrest such movement at any time, the controller may be actuated to its intermediate holding position $h$, whereby the actuating coil Off is deënergized to produce the above-mentioned balanced fluid-pressure conditions in the mechanism.

It will be understood that under relatively low-speed conditions, corresponding to the setting of the relay device 179, the contact segment 195 interrupts its circuit, whereby the "on" coil and the "off" coil for the actuating mechanism 3 are both deënergized to cause a backward movement of the controller and thus effect a reduction of the regenerated current and of the retarding effort. On the other hand, whenever the main-armature speed increases to a certain value, corresponding to the setting of the high-speed relay device 178, contact segment 189 completes the circuit of the "off" coil and, therefore, causes the main controller to advance another step, as previously described in detail, and thus effect an increase of braking effort and a reduction of speed.

When the engineer's valve 64 is manipulated to effect the application of the air-brake 65, the auxiliary resistor 194 is gradually excluded from circuit by reason of the action of the coöperating stationary and movable contact members 181, whereby the current traversing the actuating coil 193 for the low-speed relay device 179 is correspondingly reduced and, therefore, the setting of the relay device is also decreased in like degrees, which signifies an increase in the range between the above-mentioned limiting values of machine speed.

The result of the operation just described is to effect a steepening of the speed-torque characteristic of the momentum-driven machine and thus prevent the previously-mentioned undesirable torque-variation conditions.

As soon as the engineer's valve 64 is returned to its illustrated normal position, the relay devices 178 and 179 again control the action of the system in the above-described manner.

I do not wish to be restricted to the specific circuit connections or arrangement of parts herein set forth, as various modifications thereof may be effected within the spirit and scope of my invention. I desire, therefore, that only such limitations shall be imposed as are indicated in the appended claims.

I claim as my invention:

1. In a system of control, the combination with a momentum-driven dynamo-electric machine having an armature and a field winding, of means for separately exciting said field winding, a mechanical braking system, and means for automatically modifying the field-exciting circuit upon the application of said braking system.

2. In a system of control, the combination with a momentum-driven dynamo-electric machine having an armature and a field winding, of means for separately exciting said field winding, a mechanical braking system, and interlocking means dependent upon the application of said braking system for modifying the field-exciting circuit to "steepen" the speed-torque characteristic of the machine.

3. In a system of control, the combination with a momentum-driven dynamo-electric machine having an armature and a field winding, of means for separately exciting said field winding, a variable resistor included in the field-winding circuit, a mechanical braking system, and means for automatically increasing the active circuit value of said resistor upon the application of said braking system.

4. In a system of control, the combination with a momentum-driven dynamo-electric machine having an armature and a field winding, of means for separately exciting said field winding, a variable resistor included in a common circuit with said armature and said field winding, a mechanical braking system, and interlocking means dependent upon the application of said braking system for increasing the active circuit value of said resistor to "steepen" the speed-torque characteristic of the machine.

5. In a system of control, the combination with a momentum-driven dynamo-electric machine having an armature and a field winding, of means for separately exciting said field winding, a variable resistor included in a common circuit with said armature and said field winding, a controller for varying said resistor, an operating mechanism for said controller having a plurality of actuating coils, a mechanical braking system, and interlocking means dependent upon the application of said braking system for automatically governing said coils to operate said controller in its resistance-increasing direction.

6. In a system of regenerative control, the combination with a dynamo-electric machine, and means for normally operating said machine between predetermined limiting values of speed, of a mechanical braking system, and means dependent upon the application of said braking system for automatically varying the range between said limiting values.

7. In a system of regenerative control, the combination with a dynamo-electric machine, and independent means for normally operating said machine between predetermined limiting values of speed, of a mechanical braking system, and means dependent upon the application of said braking system for automatically manipulating one of said independent means to increase the range between said limiting values.

8. In a system of regenerative control, the combination with a dynamo-electric machine, and independent relay means for normally operating said machine between predetermined higher and lower limiting values of speed, of a mechanical braking system, and regulatable means dependent upon the application of said braking system for automatically varying the circuit conditions of the lower-speed relay to increase the range between said limiting values.

9. In a system of regenerative control, the combination with a dynamo-electric machine, and separate relay devices for normally operating said machine between predetermined higher and lower limiting values of speed, of a mechanical braking system, and an adjustable resistor responsive to the application of said braking system for automatically varying the resistance of the circuit of the lower-speed relay to increase the range between said limiting values.

In testimony whereof, I have hereunto subscribed my name this 6th day of June 1919.

RUDOLF E. HELLMUND.